June 4, 1946.  A. Y. DODGE  2,401,557
BEARING CONSTRUCTION
Original Filed June 16, 1943
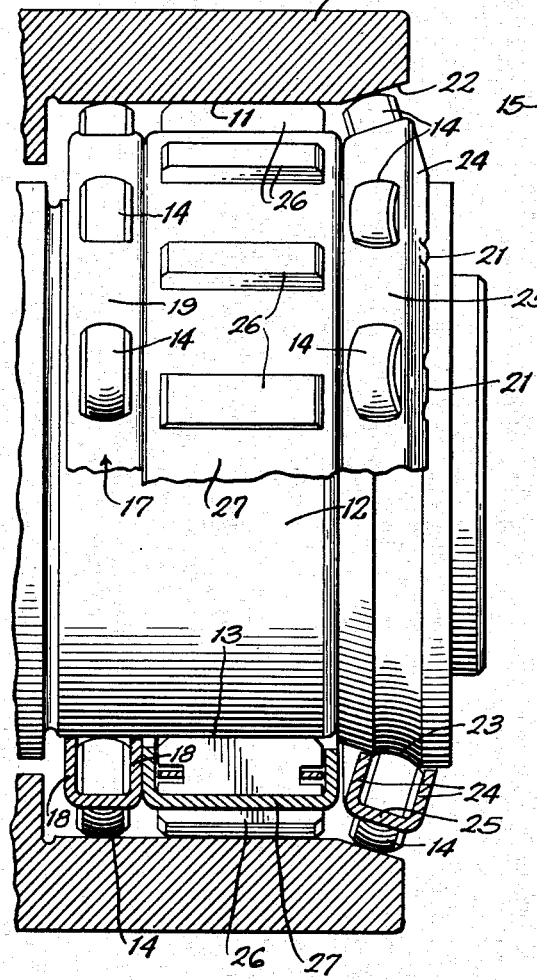
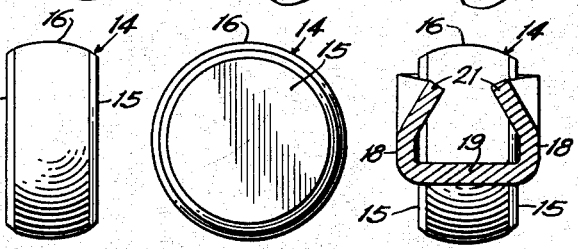
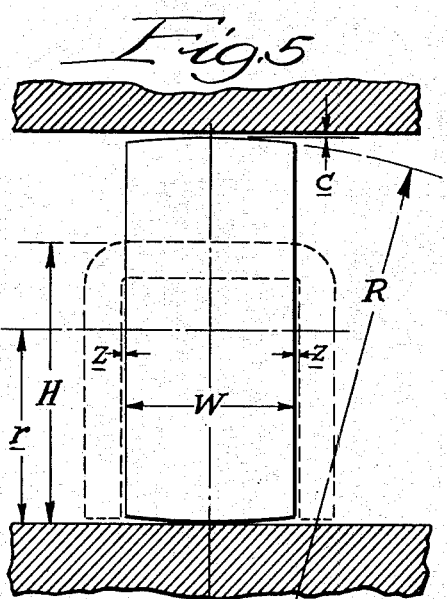
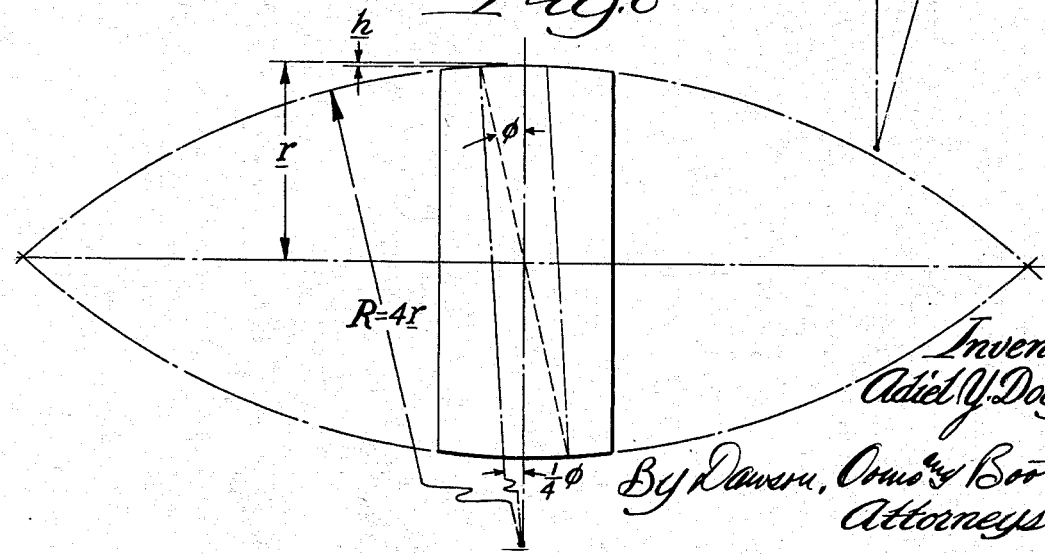
Inventor:
Adiel Y. Dodge,
By Dawson, Ooms & Booth,
Attorneys.

Patented June 4, 1946

2,401,557

UNITED STATES PATENT OFFICE 2,401,557

BEARING CONSTRUCTION

Adiel Y. Dodge, Rockford, Ill.

Original application June 16, 1943, Serial No. 491,007. Divided and this application February 4, 1944, Serial No. 521,010

4 Claims. (Cl. 308—212)

This invention relates to bearing constructions and more particularly to anti-friction bearings for rotatably connecting coaxial races.

One of the objects of the invention is to provide a bearing construction in which the bearing elements are self-aligning.

Another object of the invention is to provide a bearing construction in which the bearing elements produce a minimum of end thrust and in which scuffing of the races by the bearing elements is eliminated.

Another object of the invention is to provide a bearing construction in which relatively narrow rollers are supported and guided from their end surfaces and have a barrel shaped rolling surface so that they can be guided easily.

Still another object of the invention is to provide a bearing construction employing relatively narrow rollers which are capable of absorbing straight radial loads or combined radial and thrust loads.

A further object of the invention is to provide a bearing roller having its side surfaces curved in an axial plane about a radius different than its radius of curvature in a plane transverse to the axis.

A still further object of the invention is to provide a bearing roller having a substantially pure rolling action with a minimum of scrubbing or scuffing and which is therefore well adapted for high speed service.

The above and other objects and advantages will be more readily apparent from the following description when read in connection with the accompanying drawing, in which—

Figure 1 is an axial section with parts in elevation of a clutch and bearing unit in which the bearing construction embodies the present invention;

Figure 2 is a side elevation of a bearing roller;

Figure 3 is an end elevation of a bearing roller;

Figure 4 is a partial enlarged section illustrating the mounting of the bearing rollers in a cage; and Figures 5 and 6 are diagrams illustrating the construction of the bearing rollers.

The unit illustrated in Figure 1 is adapted to connect an outer race 10 having a cylindrical inner working surface 11 to an inner race 12 having a complementary outer cylindrical surface 13. It will be understood that either race may be arranged for free rotation in either direction as desired.

In order to connect the races for free rotation, a bearing unit is mounted therebetween comprising a series of bearing rollers 14 shaped as best seen in Figures 2 and 3. Each of the rollers is of short axial length relative to its diameter and is preferably of a length about one-half of its diameter. I have found that any length greater than one-half the diameter does not increase the load carrying capacity of the roller which is optimum when the roller length is approximately one-half or slightly less than one-half its diameter. The end surfaces of the roller as shown at 15 are substantially flat and parallel to form supporting and guiding surfaces and its side surface as shown at 16 is slightly barrelled. The radius of the side surface 16 in a plane passing through the roller axis is preferably at least four times and not more than six times greater than its radius in a plane transverse to the axis so that the roller will act in effect very much like a ball of large diameter insofar as its bearing surface on the races is concerned, while occupying only a fraction of the space required by such a ball.

The rollers are supported in an annular cage 17 shown as formed of sheet metal channel shaped in cross section with parallel sides 18 and a web portion 19 formed with openings of slightly smaller circumferential length than the diameter of the rollers so that the rollers are separated by spaced parts of the web connecting the side portions. The side portions 18 have a running fit on one of the races, shown as the inner race, and fit closely against the flat ends 15 of the rollers to support and guide the rollers. When not assembled between the races, the rollers are held in the cage by engagement with the ends of the openings in the web 19 against radial outward movement and are prevented from moving radially inward in the cage by inwardly bent parts of the side portions 18 as shown at 21 to form inwardly extending projections engageable with the rollers to limit inward movement thereof.

Since the bearing rollers running on cylindrical races are guided almost entirely by the sides of the cage engaging the flat roller ends, it is necessary that the clearance therebetween be such as to limit tilting of the rollers to an amount which will not cause excessive tightening or binding. It is also necessary that the cage be supported independently of the rollers and for this purpose the cage flanges form a close running fit on the inner cylindrical race. I have found that the maximum permissible clearance between the roller ends and the cage sides may be calculated as follows, referring to Figures 5 and 6:

Let $r$=radius of roller at right angles to roller axis and in the plane of rotation.

Let $R$=radius of roller at right angles to roller axis and in a plane 90° to the plane of rotation.

Let $c$ = clearance between roller and races.
Let $z$ = clearance at one side of roller between roller and cage.
Let $h$ = height of chord of arc formed by R through angle $\frac{1}{2}\Phi$.
Let $\Phi$ = any angle of tilt of roller.
Let $H$ = height of cage.
Let $d = 2r$.
Let $D$ = the diameter of roller in a plane 90° to the plane of rotation, through angle $\Phi$.
Let $R = 4r$.
Let $W$ = axial length of roller.

$2z$ must be an amount less than the amount which will allow roller to lean to an extent where $D = 2r + c$. So D must be less than $2r + c$.

$$\frac{D}{2} = (r - h) \times \sec \phi$$

$$h = R - \left(\cos \frac{\phi}{4} \times R\right)$$

so $$\frac{D}{2} = \left[r - \left(R - \left(\cos \frac{\phi}{4} \times R\right)\right)\right] \times \sec \phi$$

Therefore $$2\left[r - \left(R - \left(\cos \frac{\phi}{4} \times R\right)\right)\right] \times \sec \phi$$

must be less than $2r + c$. $z$ controls the extent of $\Phi$ tangent of $$\phi = \frac{2z}{H}$$

While the maximum clearance $2z$ which will control the rollers properly is expressed by the above equation, I prefer to design the rollers and cage to provide a clearance $2z$ about half that expressed by the equation.

When the bearing unit is to absorb end thrust it is preferably constructed as shown at the right of Figure 1. This unit is adapted to operate between a conical surface 22 on the outer race and a complementary surface 23 on the inner race. As shown in Figure 1, the inner surface 23 is preferably formed with a concave groove having a radius R in order to hold the rollers properly between the races under end thrust. The bearing rollers are identical with those described above and have been given the same reference numerals but are supported in an annular cage having conical parallel sides 24 connected by a web portion 25 at right angles to the sides. With this cage construction, the bearing rollers will be held at an angle as shown so that they are capable of absorbing end thrust as well as straight radial load.

I have found that with bearing rollers of this character the action more nearly simulates that of a ball than of a roller and that the rollers can easily be guided by a slight guide pressure. Since their contact with the races is confined to the central portion they can easily be guided by a light side pressure and will not tend to become tilted so that they scuff the races. Thus a minimum of end thrust in the bearing operation is developed and narrow rollers occupying a minimum of space can be employed to carry relatively large bearing loads.

The clutch unit shown in Figure 1 is more particularly described and claimed in my copending application, Serial No. 491,007 filed June 16, 1943, of which this application is a division. As shown, the clutch unit includes a plurality of tiltable grippers 26 supported in a cage 27 between the two bearing units. When the cages are rotating relative to each other in one direction the grippers will tilt to a position in which they disengage the race surfaces and when the cages are rotating in the opposite direction the grippers will engage the race surfaces and drivably connect the races.

While one embodiment of the invention has been shown and described in detail herein, it will be understood that this is illustrative only and is not intended as a definition of the scope of the invention, reference being had for this purpose to the appended claims.

What is claimed is:

1. In a bearing construction, a pair of coaxial races having roller engaging surfaces generated by rotating straight lines about the axis of the races, a series of barrel shaped rollers between the races whose length is approximately one-half of their rolling diameter and whose contour radius is approximately four times their rolling radius and whose ends are substantially flat and parallel, and a cage having substantially flat side members contacting the major portion of the roller ends, the cage side members being so spaced as to provide a total clearance between them and the roller ends less than an amount which will allow the rollers to tilt to an extent at which their diameter in the plane of rotation is equal to their central diameter plus the total clearance between the rollers and the races.

2. In a bearing construction, a pair of races having spaced cylindrical surfaces, a series of barrel shaped rollers between the races, each of the rollers having a length approximately half its diameter and a contour radius approximately four times its rolling radius and substantially flat parallel ends, and a cage between the races having flat side members for engaging the roller ends to hold the rollers against tilting and to guide them for substantially free rolling engagement with the races.

3. In a bearing construction, a pair of coaxial races having roller engaging surfaces generated by rotation of substantially straight lines about the axis of the races, a series of rollers between the races whose contour radius is greater than their rolling radius and which have substantially flat parallel ends, the rollers having substantially spot contact with the race surfaces whereby they roll freely on the race surfaces, and a cage having side rings which are substantially straight circumferentially engageable with the flat ends of the rollers to guide the rollers circumferentially and to limit tilting thereof.

4. In a bearing construction, a pair of coaxial races having roller engaging surfaces generated by rotation of substantially straight lines about the axis of the races, a series of rollers between the races whose contour radius is approximately four times their rolling radius and which have substantially flat parallel ends, the length of the rollers being less than their diameter whereby their ends are relatively large compared to their lengths, the rollers having substantially spot contact with the race surfaces to roll freely on the race surfaces, and a cage having side rings formed with substantially flat surfaces engageable with the roller ends to guide the rollers and to limit tilting thereof.

ADIEL Y. DODGE.